(12) United States Patent
Paramasivam et al.

(10) Patent No.: US 8,447,881 B2
(45) Date of Patent: May 21, 2013

(54) LOAD BALANCING FOR SERVICES

(75) Inventors: Kartik Paramasivam, Redmond, WA (US); Stuart J. Langley, Redmond, WA (US); Vinod Shanbhag, Redmond, WA (US); Pan Wang, Bellevue, WA (US); Ramasubramaniam Poornalingam, Redmond, WA (US); Brent Schmaltz, Redmond, WA (US); Jayteerth Katti, Redmond, WA (US); Govindaraj Ramanathan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1013 days.

(21) Appl. No.: 12/203,024

(22) Filed: Sep. 2, 2008

(65) Prior Publication Data
US 2010/0058451 A1 Mar. 4, 2010

(51) Int. Cl.
*G06F 15/173* (2006.01)

(52) U.S. Cl.
USPC ............................. 709/238; 709/203; 718/105

(58) Field of Classification Search
USPC .................................... 709/238, 203; 718/105
See application file for complete search history.

(56) References Cited

U.S. PATENT DOCUMENTS

| 6,970,913 | B1 | | 11/2005 | Albert et al. | |
|---|---|---|---|---|---|
| 7,114,083 | B2 | | 9/2006 | Devine et al. | |
| 7,512,707 | B1 | * | 3/2009 | Manapragada et al. | 709/240 |
| 7,738,379 | B1 | * | 6/2010 | Bakshi | 370/235 |
| 7,861,075 | B2 | * | 12/2010 | Brendel | 713/153 |
| 2003/0023669 | A1 | | 1/2003 | Delima et al. | |
| 2003/0120502 | A1 | | 6/2003 | Robb et al. | |
| 2003/0172167 | A1 | * | 9/2003 | Judge et al. | 709/229 |
| 2004/0243709 | A1 | * | 12/2004 | Kalyanavarathan et al. | 709/226 |
| 2004/0268357 | A1 | | 12/2004 | Joy et al. | |
| 2004/0268358 | A1 | | 12/2004 | Darling et al. | |
| 2005/0010754 | A1 | | 1/2005 | Brendel | |
| 2005/0022203 | A1 | * | 1/2005 | Zisapel et al. | 718/105 |
| 2005/0038906 | A1 | * | 2/2005 | Banes et al. | 709/238 |
| 2006/0031442 | A1 | * | 2/2006 | Ashley et al. | 709/223 |
| 2006/0064478 | A1 | | 3/2006 | Sirkin | |

(Continued)

FOREIGN PATENT DOCUMENTS

EP 1209876 5/2002

OTHER PUBLICATIONS

Litespeed Technologies, Inc., "LiteSpeed Load Balancer", Based on information and belief available, at least as early as Apr. 23, 2008, copyright 2003-2008, 2 pages.

Sun Microsystems, Inc., "Configuring application server load balancing",Secure Global Desktop 4.3 Administration Guide, Copyright 1997-2006, 5 pages.

(Continued)

*Primary Examiner* — Duyen Doan
(74) *Attorney, Agent, or Firm* — Workman Nydegger

(57) ABSTRACT

The present invention extends to methods, systems, and computer program products for load balancing for services. Embodiments of the invention facilitate load balancing between instances of a service based on affinitization of messages, based on content of the message. For example, messages in the same session can be dispatched to the same service instance. A sequence or series of related messages associated with long running and/or stateful services are more likely to be dispatched to the same instance of the service. Thus, if the service instance has persisted client state, there is an increased likely of utilizing the persisted client state and not having another service instance recreate the client state.

22 Claims, 4 Drawing Sheets

U.S. PATENT DOCUMENTS

| | | |
|---|---|---|
| 2006/0130133 A1 | 6/2006 | Andreev et al. |
| 2006/0155862 A1 | 7/2006 | Kathi et al. |
| 2007/0198721 A1* | 8/2007 | Ikawa et al. .................. 709/226 |
| 2008/0065652 A1 | 3/2008 | McCann et al. |
| 2008/0195754 A1* | 8/2008 | Cuomo et al. ................ 709/238 |
| 2008/0228926 A1* | 9/2008 | Shiratzky et al. ............. 709/228 |
| 2009/0271798 A1* | 10/2009 | Iyengar et al. ............... 718/105 |

OTHER PUBLICATIONS

Zeus Technology, "ZXTM Load balancing Microsoft IAG Using ZXTM with Microsoft IAG (Intelligent Application Gateway) Server", Copyright Zeus Technology Limited 2007, 31 pages.
Chapter 7, "Web Server Scalability", Based on information and belief available, at least as early as Apr. 23, 2008, 55 pages.

* cited by examiner

LOAD BALANCING FOR SERVICES

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic content. Accordingly, the performance of many computing tasks are distributed across a number of different computer systems and/or a number of different computing components.

In many environments, multiple remote users access applications and data through a centralized remote location. For example, a number of client machines can access a Web service via the Internet. In many environments, and especially for services (or other applications) with increased workload, multiple instances of the service (or application) are created to provide a better user experience. However, it is of little benefit to have multiple instances of a service if the overall workload is not relatively evenly distributed crossed the multiple instances of the service. For example, if a one instance (or a small subset of instances) is overburdened and at the same time other instances are underutilized, the benefit of having multiple instances is significantly reduced.

Thus, multiple instance server environments typically include some type of load balancing technology to more evenly distribute workload between across instances of a service. For example, when communication for a service is received, a load balancer can be route the communication to an instance of the service having a reduced load. Thus, an overall workload for a service can be more evenly distributed across multiple instances of the service.

However, determining how to route newly received communication is primarily based on instance workloads at the time new communication is received. For example, it may that a client had prior communication with a particular instance of a service related to an ongoing use of the service. However, when the client sends new communication related to the ongoing use of the service, the new communication may be routed to a different instance of the service based on essentially soley on workload at the time the new communication is received. This is less than optimal for longer running and/or stateful services.

Communication between a client and a stateful service can include a series of request/reply sequences. Between each request/reply sequence the service can persist some state related to the communication, such as, for example, maintaining intermediate values while waiting for a further client request. However, if an instance of the service that persisted state experiences a subsequently high workload between request/reply sequences, a load balancer may send further client requests to a different instance of the server. Unfortunately, when communication is switched from one instance of the service to another instance of the service, the other instance of the service may not be aware of the persisted state for the communication. As such, the other instance is required to recalculate the persisted state.

Re-loading (already persisted) state at a new instance consumes more resources than allowing the instance that persisted the state to process the next client request in a communication. Thus, diverting communication to a new instance can unnecessarily increase the overall workload of a service. Further, memory resources for the instance that persisted the state are essentially wasted, since the persisted state is not used for further communication with the client.

BRIEF SUMMARY

The present invention extends to methods, systems, and computer program products for load balancing for services. In some embodiments, an application load balancer receives a first client initiated message directed to an application. The first client initiated message is the first message (e.g., an activation message) in a plurality of messages included in a message sequence. The application load balancer assigns a specified identifier to the plurality of messages included in the message sequence based on the characteristics of the first client initiated message. The application load balancer determines that the assigned identifier is not mapped to an instance of the application.

The application load balancer maps the specified identifier to a specified instance of the application in accordance with a load balancing algorithm The mapping assists in balancing the load for the application across the plurality of instances of the application. The application load balancer sends the message to the specified instance of the application.

The application load balancer receives a second client initiated message directed to the application subsequent to receiving the first client initiated message. The application load balancer assigns the specified identifier to the second client initiated message based on the characteristics of the second client initiated message. The application load balancer correlates the second client initiated message with the first client initiated message (e.g., resulting in a correlated message that is correlated with an activation message), based on the mapping of the specified identifier to the specified instance of the application. The application load balancer sends the second client initiated message to the specified instance of the application in response to the correlation.

In other embodiments, an application load balancer receives an application instance initiated message from a specified instance of a plurality of instances of an application. The application instance initiated message is directed to another application. The application load balancer assigns a specified identifier to the application instance initiated message based on the characteristics of the application instance initiated message. The application load balancer maps the specified identifier to the specified instance of the application to balance the load for the application across the plurality of instances of the application. The mapping assists in balancing the load for the application across the plurality of instances of the application.

The application load balancer sends the message to the other application. The application load balancer receives a return message from the other application directed to the application. The application load balancer assigns the specified identifier to the return message based on the characteristics of the return message. The application load balancer correlates the return message with the application instance initiated message based on the mapping of the specified identifier to the specified instance of the application. The application load balancer sends the return message to the specified instance of the application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
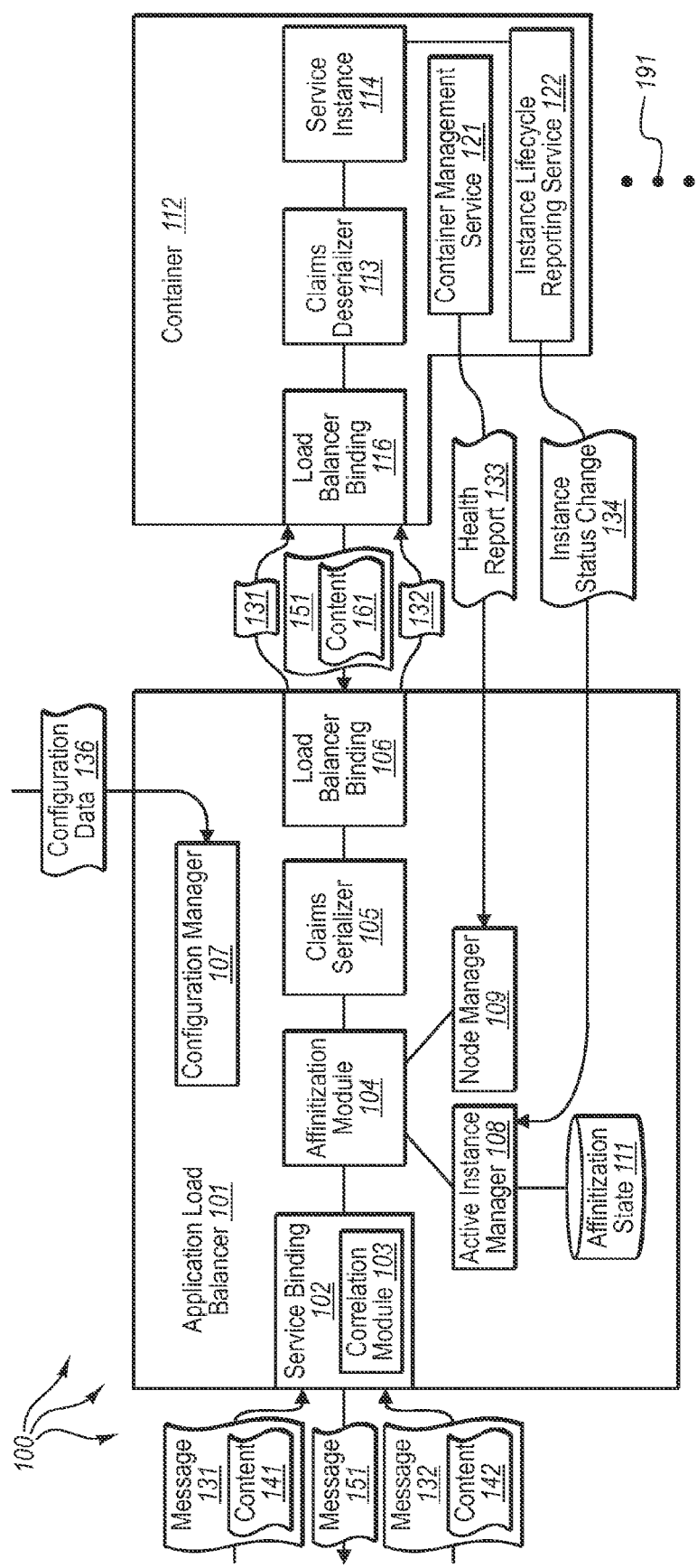
FIG. 1 illustrates a view of an example computer architecture that facilitates load balancing for services.

The present invention extends to methods, systems, and computer program products for load balancing for services. In some embodiments, an application load balancer receives a first client initiated message directed to an application. The first client initiated message is the first message (e.g., an activation message) in a plurality of messages included in a message sequence. The application load balancer assigns a specified identifier to the plurality of messages included in the message sequence based on the characteristics of the first client initiated message. The application load balancer determines that the assigned identifier is not mapped to an instance of the application.

The application load balancer maps the specified identifier to a specified instance of the application in accordance with a load balancing algorithm The mapping assists in balancing the load for the application across the plurality of instances of the application. The application load balancer sends the message to the specified instance of the application.

The application load balancer receives a second client initiated message directed to the application subsequent to receiving the first client initiated message. The application load balancer assigns the specified identifier to the second client initiated message based on the characteristics of the second client initiated message. The application load balancer correlates the second client initiated message with the first client initiated message (e.g., resulting in a correlated message that is correlated with an activation message).based on the mapping of the specified identifier to the specified instance of the application. The application load balancer sends the second client initiated message to the specified instance of the application in response to the correlation.

In other embodiments, an application load balancer receiving an application instance initiated message from a specified instance of a plurality of instances of an application. The application instance initiated message is directed to another application. The application load balancer assigns a specified identifier to the application instance initiated message based on the characteristics of the application instance initiated message. The application load balancer maps the specified identifier to the specified instance of the application to balance the load for the application across the plurality of instances of the application. The mapping assists in balancing the load for the application across the plurality of instances of the application.

The application load balancer sends the message to the other application. The application load balancer receives a return message from the other application directed to the application. The application load balancer assigns the specified identifier to the return message based on the characteristics of the return message. The application load balancer correlates the return message with the application instance initiated message based on the mapping of the specified identifier to the specified instance of the application. The application load balancer sends the return message to the specified instance of the application.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

With this description and following claims, a "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates load balancing for services. As depicted, computer architecture 100 includes application load balancer 101 and container 112. Vertical ellipsis 141 represents that one or more other containers are also included in computer architecture 100. Computer architecture 100 can represent a container group that contains application load balancer 101, container 112, and the one or more other containers. Each of the components can be connected to one another over a system bus and/or over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Application load balancer 101 further includes service binding 102, affinitization module 104, claims serializer 105, load balancer binding 106, configuration manager 107, active instance manager 108, node manager 109 and affinitization state 111. Generally, service binding 102 is a communication stack that sources messages for application load balancer 101. Correlation module 103, within service binding 102, is configured to correlate messages based on message content and inserts a correlation identifier into messages (e.g., into message headers) to indicate correlated messages.

Generally, application load balancer 101 is configured as part of a service or contained in the same container group as an application that is being load balanced. As such, application load balancer 101 has the same security model as the application. Thus, application load balancer 101 can access portions of a message for the application with the same rights as the application. Application load balancer 101 can be designed or built into an application when the application is designed. Alternately, application load balancer 101 can be integrated into an application when the application is initiated, such as, for example, in computer architecture 100.

Affinitization module 104 is configured to examine messages (e.g., message headers) determine how a message is to be dispatched to service instances. Affinitization module 104 can affinitize messages on a variety of different pivots, including: transport session, protocol session, message session (e.g., correlation identifiers from correlation module 103), message contents, etc. Affinitizing can include generating an affinity ID to "pin" messages in a sequence or series messages to a service instance or determine what service instance is to receive a message. Using affinitization there is a significantly increased likelihood that messages in the same session can be correlated with one another and dispatched to the same service instance.

Generally, application load balancer 101 can learn from affinitization errors. Since application load balancer 101 can be included in container group 112 (the container group including service instance 114), it can understand exceptions thrown by container 112. Thus, if a message is affinitized and dispatched to a different backend container then the one the instance is currently active on, an exception thrown by the different backend container contains data indicative that the instance is currently active on elsewhere.

For example, application load balancer 101 can understand a redirect exception returned by a back end application. The redirect exception can contain information about where the application instance is currently running. This information is used by application load balancer 101 to retransmit the message to the new destination.

Claims serializer 105 is configured to examine message authentication information and serialize any security claims derived from a message into a message header. The message header is then included in the message. Accordingly, claims in a message can be re-serialized at a service instance to perform authorization checks.

Load balancer binding 106 is a communication stack used between application load balancer 101 and container 112. Node manager 109 is configured to access dynamic and static information about service instances that application load balancer 101 is balancing across. For example, node manager can access dynamic and static information for service instance 114 from health report 133. Affinitization module 103 can used the dynamic and static information to assist in determining how to dispatch a message. Active instance manager 108 is configured to access information about service instances that are currently active for a load balanced service and the location of each service instance of the load balanced service. For example, active instance manager 108 can access information for service instance 114 from instances status change 134. Active instance manager 108 can store such information in affinitization state 111.

Configuration manager 107 is configured to provide application load balancer 101 with its configuration. Configuration manager 107 can process configuration data, such as, for example, configuration data 136 to load a configuration for application load balancer 101. Configuration data can specify throttling or other behavior for a service that is applicable to service instances of the service.

Container 112 includes load balancer binding 116, claims deserializer, 113, service instance 114, container management service 121, and instance lifecycle reporting 122. Service instance 114 is an instance of a service, such as, for example, a long running and/or stateful Web service (e.g., based on Windows Foundation ("WF") or Windows Communication Foundation ("WCF") technologies). Service instances 114 can be one of a plurality of instances of a service. Other instances of the service can be running on other containers represented by vertical ellipsis 141.

Load balancer binding 116 is a communication stack used between application load balancer 101 and container 112.

Claims deserializer 113 is configured to examine serialized claim headers and reconstruct security claims for performing authorization. Claims deserializer is also configured to authenticate application load balancer 101 to provide some assurance that security claims are being sent form application load balancer 101 (e.g., as an anti-spoofing mechanism). Claims deserializer 113 is also configured to remove claims for application load balancer 101, for example, added to a message as a result of application load balancer 101 forwarding the message. Thus, client authentication can be performed at load balancer 101 followed by performing client authorization at container 112.

Container management service 121 is configured to provide health information about the health of the computer system running service instance 114. The health of the computer system can be determined from various environmental conditions, such as, for example, memory, CPU, etc. Container management service 121 can output health information, such as, for example, in health report 133.

Instance lifecycle reporting service 122 is configured to provide events when the state of service instance 114 changes, such as, for example, when service instance 114 completes or dehydrates/passivates. For example, either of these two events can be used by active instance manager 108 to clean up its instance affinity map (stored in affinitization state 111). Instance lifecycle reporting service 122 can output events, such as, for example, in instance status change 134.

Figure 3:
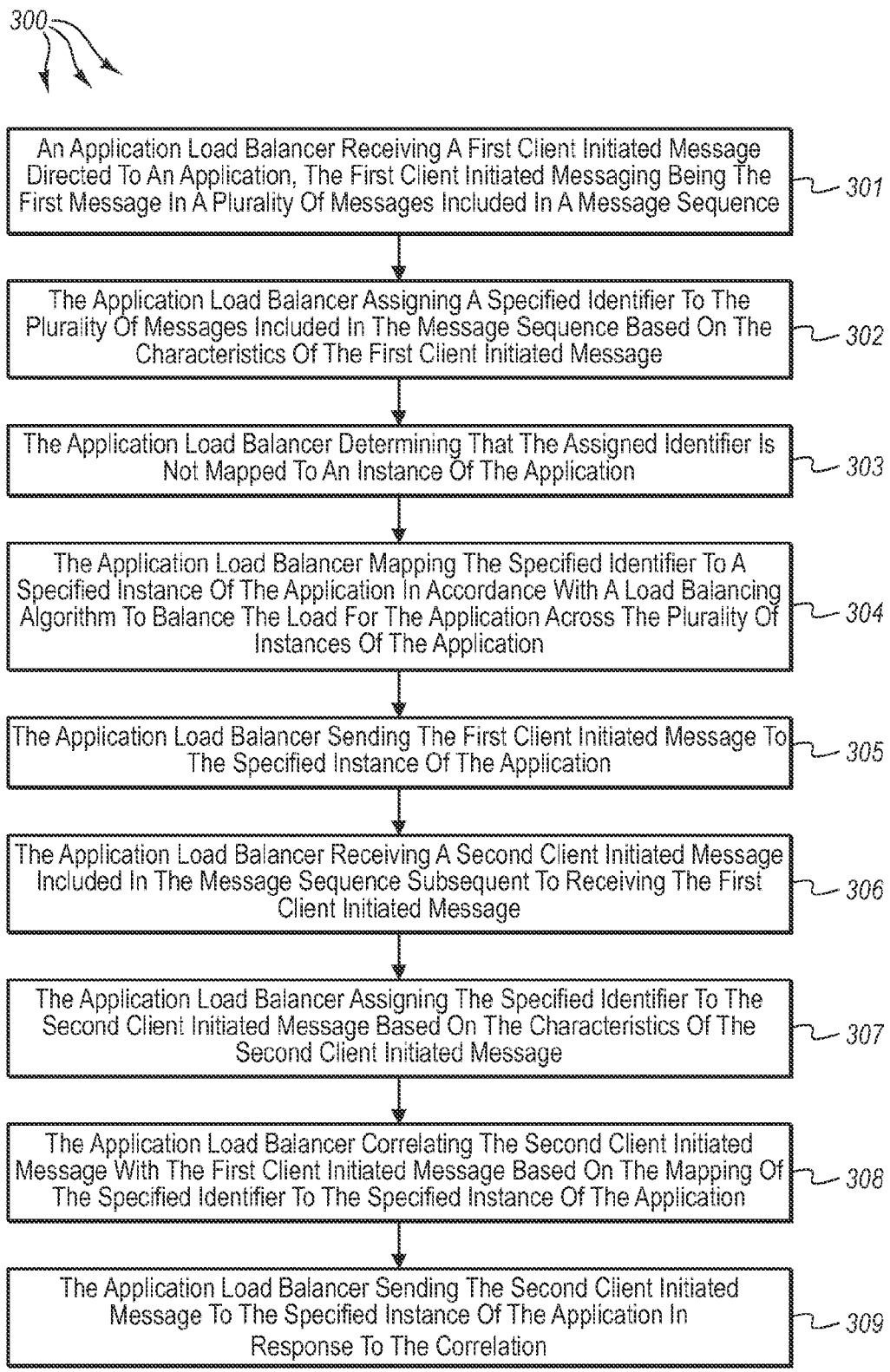
FIG. 3 illustrates a flow chart of an example method for load balancing for services.

Communication between a client and a service instance can be initiated either at the client or the service instance. FIG. 3 illustrates a flow chart of an example method 300 for load balancing for services, in embodiments with client initiated communication. The method 300 will be described with respect to the components and data in computer architecture 100.

Method 300 includes an act of the application load balancer receiving a first client initiated message directed to the application, the first client initiated message being the first message in a plurality of messages included in a message sequence (act 301). For example, application load balancer 101 can receive message 131, including content 141, from a client. Message 131 can be the first message in a sequence of messages that includes message 132 and one or more other messages. Thus, message 131 can be viewed as an activation message for activating load balancing for the message sequence. As previously described, application load balancer 191 can be integrated as part of an application. Thus, application load balancer can be integrated as part of the application of which service instance 114 is an instance. Accordingly, application load balancer 101 can access message content under the same security model as service instance 114.

Method 300 includes an act of the application load balancer assigning a specified identifier to the first client initiated message based on the characteristics of the first client initiated message (act 302). For example, affinitization module 104 can assign an affinity ID to the message sequence that includes message 131. The affinity ID can be assigned, for example, based on correlation to a specified message session determined by correlation module 103, content 141, etc.

Method 300 includes an act of the application load balancer determining that the assigned identifier is not mapped to an instance of the application (act 303). For example, active instance manager 108 can determine that the affinity ID assigned to message 131 is not included in affinitization state 111. Method 300 includes an act of the application load balancer mapping the specified identifier to a specified instance of the application in accordance with a load balancing algorithm (act 304). For example, affinitization module 104 can map the assigned affinity ID to server instance 114 in accordance with a load balancing algorithm. Virtually any load balancing algorithm can be used. In some embodiments, a round robin algorithm assigns messages to application instances based on lifecycle of the application instance and health state information for the computer system running the specified application instance. For example, affinitization module 104 can map the assigned affinity ID to service instance 114 based health report 133 (for the computer system running service instance 1140 and instance status change 134 (for service instance 114) along with similar information for other services instances in other containers represented by ellipsis 191.

Method 300 includes an act of the application load balancer sending the first client initiated message to the specified instance of the application (act 305). For example, application load balancer 101 can send message 131 to container 112.

Method 300 includes an act of the application load balancer receiving a second client initiated message included in the message sequence subsequent to receiving the first client initiated message (act 306). For example, application load balancer 101 can receive message 132 from the client. Method 300 includes an act of the application load balancer assigning the specified identifier to the second client initiated message based on the characteristics of the second client initiated message (act 307). For example, affinitization module 104 can assign the affinity ID of message 131 to message 132, for example, based on correlation to the same specified message session as message 131, inclusion in the message sequence of message 131, content 142, etc.

Method 300 includes an act of the application load balancer correlating the second client initiated message with the first client initiated message based on the mapping of the specified identifier to the specified instance of the application (act 308). For example, active instance service manager 104 can determine that the affinity ID assigned to message 132 is already included in affinitization state 111 (from assignment of the affinity ID to message 131) and is mapped to service instance 114. As such, message 132 can be viewed as a correlated message that is correlated with message 131, which may be viewed as an activation message. Method 300 includes an act of the application load balancer sending the second client initiated message to the specified instance of the application in response to the correlation (act 309). For example, application load balancer 101 can send message 132 to container 112.

Figure 4:
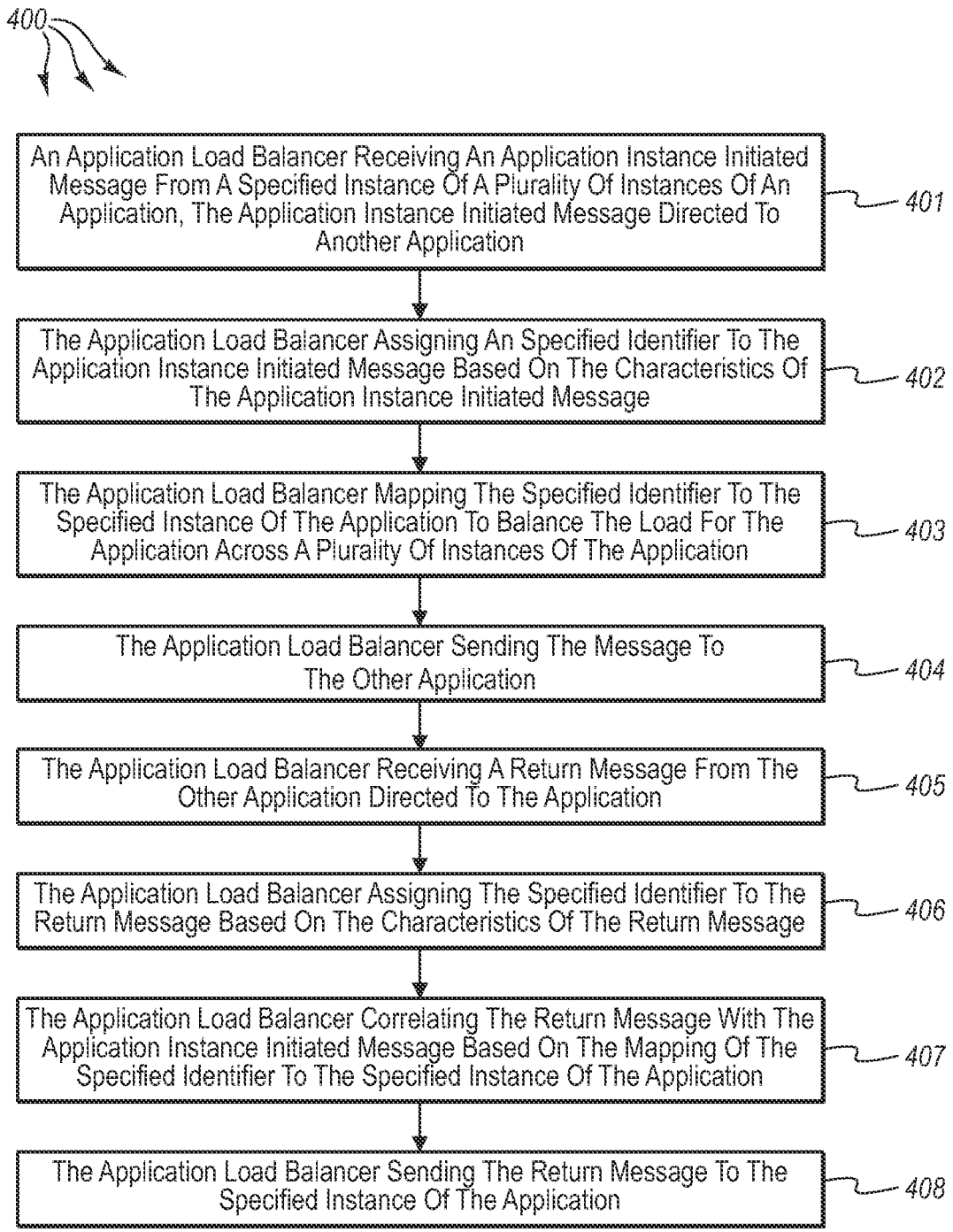
FIG. 4 illustrates a flow chart of an example method for load balancing for services.

FIG. 4 illustrates a flow chart of an example method 400 for load balancing for services, in embodiments with service instance initiated communication. The method 400 will be described with respect to the components and data in computer architecture 100.

Method 400 includes an act of the application load balancer receiving an application instance initiated message from a specified instance of the plurality of instances of the application, the application instance initiated message directed to another application that is external to the plurality of instances of an application (act 401). For example, application load balancer 101 can receive message 151 from container 112. Message 151 can be directed to another application in computer architecture 100 that is external to container 112 and application load balancer 101. For example, message 151 can be directed to an application that is connected to application load balancer via a wired or wireless network connection. Method 400 includes an act of the application load balancer assigning a specified identifier to the application instance initiated message based on the characteristics of the application instance initiated message (act 402). For example, affinitization module 104 can assign an affinity ID to message 151 based on a message session, protocol session, transport session, contents 161, etc., for message 151.

Method 400 includes an act of the application load balancer mapping the specified identifier to the specified instance of the application to balance the load for the application across the plurality of instances of the application (act 403). For example, active instance manager 108 can map the affinity ID for message 151 to service instance 114 since the message originated from container 112. In this embodiments, message 151 can be viewed as an activation message. Method 400 includes an act of the application load balancer sending the message to the other application (act 404). For example, application load balancer 101 can send message 151 to a client.

Method 400 includes an act of the application load balancer receiving a return message from the other application directed to the application (act 405). For example, application load balancer 101 can receive message 132 from the client. Method 400 includes an act of the application load balancer assigning the specified identifier to the return message based on the characteristics of the return message (act 406). For example, affinitization module 104 can assign a correlation ID to message 132, for example, based on correlation to the same specified message session as message 151, conentl42, or inclusion in a message sequence, etc.

Method 400 includes an act of the application load balancer correlating the return message with the application instance initiated message based on the mapping of the specified identifier to the specified instance of the application (act 407). For example, active instance service manager 104 can refer to affinitization state 111 to map the correlation ID to the affinity ID assigned to message 151. This essentially maps message 132 for delivery to service instance 114. As such, message 132 can be viewed as a correlated message that is correlated with message 151, which may be viewed as an activation message. Method 400 includes an act of the application load balancer sending the return message to the specified instance of the application (act 408). For example, application load balancer 101 can send message 132 to container 112.

An application load balancer can be built using the same infrastructure that is used to build the service the application load balancer is to balance. Further, since application load balancers can be included in a global container along with the service, application load balancers can receive messages from any transport channel of the service. As such, application load balancers can be configured to receive messages from polling transports, such as, for example, queues, databases, external stores, etc. Accordingly, embodiments of the invention permit services to be more easily scaled out. Further, inclusion in the same global container permits an application load balancer to access the contents of messages directed to the application under the same security model as the application.

Figure 2:
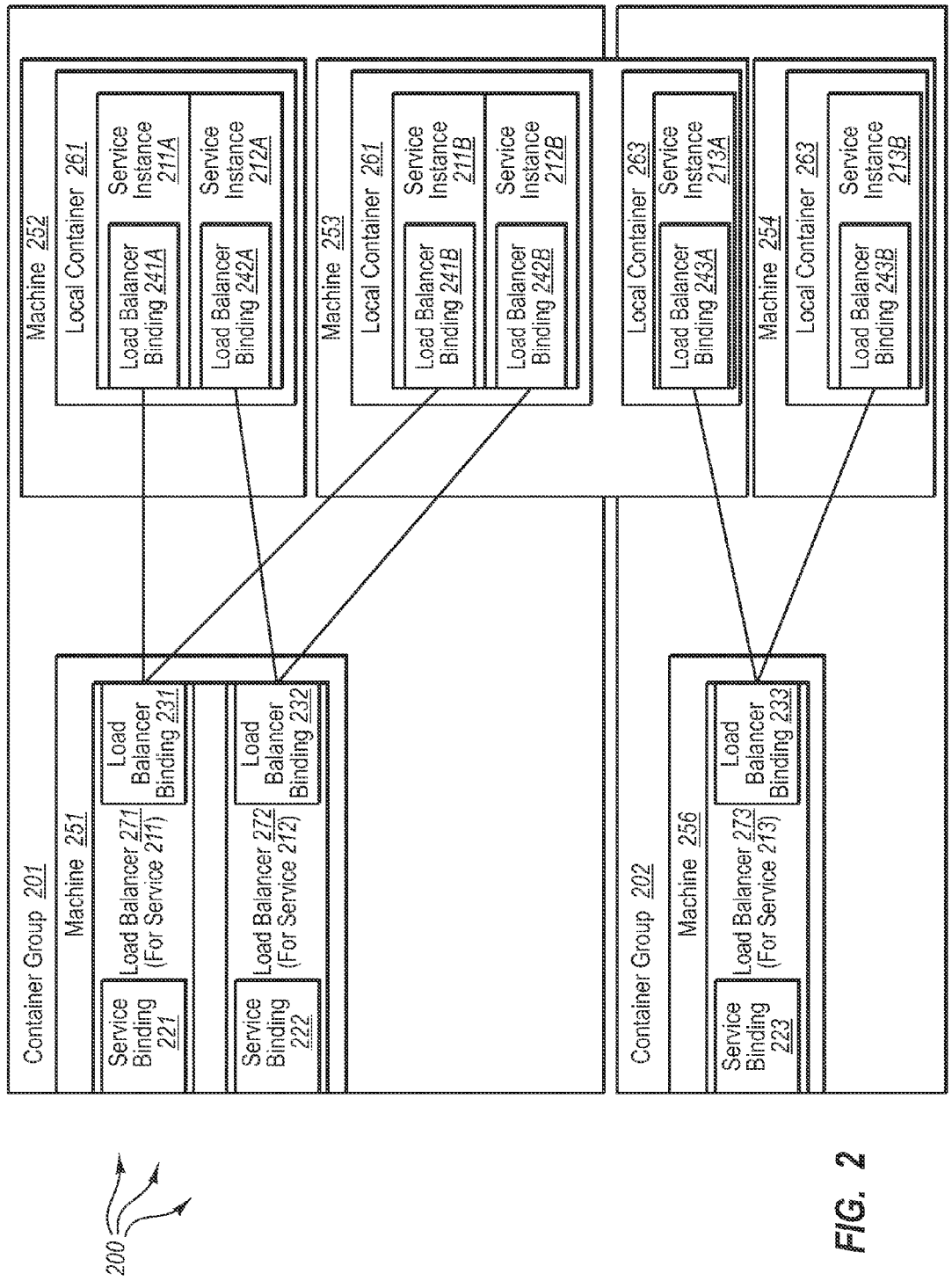
FIG. 2 illustrates a view of an example computer architecture that facilitates load balancing for services.

For example, FIG. 2 illustrates a view of an example computer architecture 200 that facilitates load balancing for services. As depicted, computer architecture 200 includes container group 201 and container group 202. Container group 201 includes load balancer 271 and load balancer 272 (at machine 251), and local container 261 at machine 252. Contain group 202 includes load balancer 273 at machine 256 and local container 263 at machine 254. Machine 253 includes location container 261 and location container 263. Local container 261 is included in container group 201 and local container 263 is contained in container group 202.

Within computer architecture 200, references ending in a letter represent instances of a service corresponding to their respective number respectively. Thus, service instances 211A and 211B represent instances of service 211, service instances 212A and 212B represent instances of service 212, and service instances 213A and 213B represent instances of service 213. Accordingly, as depicted in computer architecture 200, each service has its own corresponding load balancer: load balancer 271 balances at least between a service instance 211A and 211B, load balancer 272 balances at least between a service instance 212A and 212B, and load balancer 273 balances at least between a service instance 213A and 213B.

Each of the load balancers has a corresponding service binding to receive messages: load balancer 271 includes service binding 221, load balancer 272 includes service binding 222, and load balancer 273 includes service binding 223. Each of the load balancers also includes a load balancer binding for communication with service instances: load balancer 271 includes load balancer binding 231, load balancer 272 includes load balancer binding 232, and load balancer 273 includes load balancer binding 233.

Each service instance also includes a load balancer binding for communicating with its corresponding load balancer. For example, service instance 211A and 211B contain load balancer bindings 241A and 241B for communicating with load balancer 271. Service instance 212A and 212B contain load balancer bindings 242A and 242B for communicating with load balancer 272. Service instance 213A and 213B contain load balancer bindings 243A and 243B for communicating with load balancer 273. Thus, for each service instance endpoint there is a corresponding endpoint at an application load balancer.

Accordingly, embodiments of the invention facilitate load balancing between instances of a service based on message affinitization. For example, messages in the same session can be dispatched to the same service instance. A sequence or series of related messages associated with long running and/or stateful services are more likely to be dispatched to the same instance of the service. Thus, if the service instance has persisted client state, there is an increased likely of utilizing the persisted client state and not having another service instance recreate the client state.

Embodiments of the invention also facilitate_distributing messages to a service deployed in a server farm. For example, embodiments affinitize correlated messages to cached in-memory instances of services, which can be short or long running services. To facilitate distribution and affinitization of correlated messages, a load balancer acts as part of the application to perform the necessary decryption and authentication of the messages before passing the security information to the real application to perform authorization. Since correlation is based on content, and the content of the message is based subject to changes in the application, the application load balancer participates in any kind of versioning of the real application. That is, the application load balancer is able to perform its duties even when there is a new version of the application which has new message contracts (and hence a different message content).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. Within a computer architecture, the computer architecture including a plurality of instances of an application and an application load balancer for the application, the application load balancing being part of the application, instances of the application running on machines in a farm of machines, a method for balancing the load for the application across the plurality of instances of the application, the method comprising:

an act of the application load balancer receiving a first client initiated message directed to the application, the application load balancer being integrated as part of the application such that the application load balancer can access message content under the same security model as the application, the first client initiated message being the first message in a plurality of messages included in a message sequence;

an act of the application load balancer assigning a specified identifier to the first client initiated message based on the characteristics of the first client initiated message, the specified identifier being inserted into the message;

an act of the application load balancer determining that the specified identifier is not mapped to an instance of the application;

an act of the application load balancer mapping the specified identifier to a specified instance of the application in accordance with a load balancing algorithm to balance the load for the application across the plurality of instances of the application;

an act of the application load balancer sending the first client initiated message to the specified instance of the application;

an act of the application load balancer receiving a second client initiated message included in the message sequence subsequent to receiving the first client initiated message;

an act of the application load balancer assigning the specified identifier to the second client initiated message based on the characteristics of the second client initiated message;

an act of the application load balancer correlating the second client initiated message with the first client initiated message based on the mapping of the specified identifier to the specified instance of the application;

an act of the application load balancer sending the second client initiated message to the specified instance of the application in response to the correlation:

subsequent to sending the second client initiated message to the specified instance of the application, an act of the application load balancer receiving a redirect exception from the specified instance of the application; and based on the redirect exception:

an act of the application load balancer determining that an error occurred in assigning the specified identifier to the second client initiated message;

an act of the application load balancer assigning a different identifier to the second client initiated message based on the characteristics of the second client initiated message; and an act of the application load balancer sending the second client initiated message to a different instance of the application.

2. The method as recited in claim 1, further comprising correlating the first client initiated message with a message session based on the content of the first client message.

3. The method as recited in claim 1, the act of assigning specified identifier to the first client initiated message comprises an act of assigning an affinity ID to the first client message to associate the first client message with other messages from the first client that are directed to the application.

4. The method as recited in claim 3, wherein the act of assigning an affinity ID to the first client message comprises an act of assigning an affinity ID to the first client message based on one or more of the transport session, protocol session, message contents, and message session associated with first client message.

5. The method as recited in claim 3, wherein the act of the application load balancer assigning the specified identifier to the second client initiated message comprises assigned the affinity ID to the second client initiated message.

6. The method as recited in claim 1, wherein the act of the application load balancer mapping the specified identifier to a specified instance of the application comprises an act of mapping the specified identifier to a specified instance of the application based on environmental conditions at each of the plurality of instances of the application.

7. The method as recited in claim 1, wherein the act of the application load balancer mapping the specified identifier to a specified instance of the application comprises an act of mapping the specified identifier to a specified instance of the application based on specified instance of the application being idle.

8. The method as recited in claim 1, further comprising:

an act of the application load balancer examining authentication information in the first client initiated message to authenticate the client; and an act of serializing a security claim so that the application instance can use the security claim for an authorization check.

9. The method as recited in claim 1, wherein the application load balancer receives client initiated messages from a polling transport session selected from among a queue, a database, and an external store.

10. Within a computer architecture, the computer architecture including a plurality of instances of an application and an application load balancer for the application, the application load balancing being part of the application, each instance of the application running on a different corresponding machine, a method for balancing the load for the application across the plurality of instances of the application, the method comprising:

an act of the application load balancer receiving an application instance initiated first message from a specified instance of the plurality of instances of the application, the application instance initiated first message directed to another application that is external to the plurality of instances of an application, the application instance initiated first message comprising an activation message that is an initial message in a plurality of messages in a message sequence;

an act of the application load balancer assigning a specified identifier to the application instance initiated first message based on characteristics of the application instance that initiated the application instance initiated first message, the specified identifier being inserted into the first message;

an act of the application load balancer mapping the specified identifier to the specified instance of the application to balance the load for the application across the plurality of instances of the application;

an act of the application load balancer receiving an external application initiated second message from the other application directed to the application;

an act of the application load balancer assigning the specified identifier to the external application initiated second message based on the characteristics of the external application initiated second message;

an act of the application load balancer correlating the external application initiated second message with the application instance initiated message based on the mapping of the specified identifier to the specified instance of the application;

an act of the application load balancer sending the external application initiated second message to the specified instance of the application;

subsequent to sending the external application initiated second message to the specified instance of the application, an act of the application load balancer receiving a redirect exception from the specified instance of the application; and based on the redirect exception:
an act of the application load balancer determining that an error occurred in assigning the specified identifier to the external application initiated second message;

an act of the application load balancer assigning a different identifier to the external application initiated second message based on the characteristics of the external application initiated second message; and an act of the application load balancer sending the external application initiated second message to a different instance of the application.

11. The method as recited in claim 10, further comprising correlating the application instance initiated first message with a message session based on the content of the application instance initiated first message.

12. The method as recited in claim 10, wherein the act of assigning a specified identifier to the application instance initiated first message comprises an act of assigning an affinity ID to the application instance initiated first message to associate the application instance initiated first message with other messages directed to the application instance.

13. The method as recited in claim 12, wherein the act of assigning an affinity ID to the application instance initiated first message comprises an act of assigning an affinity ID to the application instance initiated first message based on one or more of the transport session, protocol session, and message session associated with application instance initiated first message.

14. The method as recited in claim 12, wherein the act of the application load balancer assigning the specified identifier to the external application initiated second message comprises an act of assigning the affinity ID to the external application initiated second message.

15. The method as recited in claim 10, further comprising:
an act of the application load balancer examining authentication information in the external application initiated second message to authenticate the client; and
an act of serializing a security claim so that the application instance can use the security claim for an authorization check.

16. The method as recited claim 10, wherein the application load balancer receives client initiated messages from a polling transport session selected from among a queue, a database, and a external store.

17. A load balancing system for balancing an application load across a plurality of instances of the application, the load balancing system comprising:
at least one computer system;
system memory; and
one or more computer readable-storage media having stored thereon computer-executable instructions representing an application, the application including a plurality of instances of the application running on different machines and an application load balancer running on a different machine, the application load balancer for balancing the load across the plurality of instances of the application, wherein each instance of the application is configured to:
communicate with the application load balancer through a communication stack;
deserialize serialized security claim headers;
reconstruct security claims from deserialzed security claim headers;
provide health state information related to the health of the application instance;
provide lifecycle events related status changes at the application instance; and
send redirect exception messages if a message is incorrectly routed to the instance of the application; and
wherein the application load balancer is configured to:
receive messages directed to the application;
assign identifiers to messages based on message characteristics, the messages including at least an activation message that is a first message in a plurality of messages of a message sequence, such that even the activation message is assigned an identifier;
receive lifecycle events from each of the plurality of application instances and health state information from corresponding computer systems running the plurality of application instances;
determine that an assigned identifier is not mapped to an application instance;
map assigned identifiers to application instances based on received health state information and received lifecycle events in response to determining that an assigned identifier is not mapped to an application instance such that a series of the messages with the same characteristics can be correlated with one another;
determine that an assigned identifier is mapped to an application instance;
correlate a received message with one or more previously received messages in a series of messages based on an assigned identifier in response to determining that the assigned identifier is mapped to the application instance;

send a received message to an application instance so as to balance the load for the application across the plurality of instances of the application; and correct the correlation between the received message with the one or more previously received messages in the series of messages in response to a redirect exception message.

18. The load balancing system as recited in claim 17, wherein the application load balancer being configured to assign identifiers to messages based on message characteristics comprises the application load balancer being configured to affinity IDs to messages based on one or more of transport session, protocol session, and message session associated with the message.

19. The load balancing system as recited in claim 17, wherein the application load balancer being configured to assign identifiers to messages based on message characteristics comprises the application load balancer being configured to assign the same identifier to different messages that have similar message characteristics.

20. The load balancing system as recited in claim 17, wherein the application is a stateful Web service.

21. The method of claim 1, wherein the application load balancer assigns the specified identifier to the first client initiated message based on content of the first client initiated message.

22. The method of claim 1, wherein the specified identifier is inserted into the message within a header of the message.

* * * * *